United States Patent
Robson et al.

(10) Patent No.: US 7,957,359 B1
(45) Date of Patent: Jun. 7, 2011

(54) METHOD OF RESOURCE ALLOCATION IN A MULTIPLE ACCESS WIRELESS COMMUNICATIONS NETWORK

(75) Inventors: Julius Robson, Dunmow (GB); John Hudson, Stansted (GB)

(73) Assignee: Nortel Networks Limited, Mississauga, Ontario (CA)

(*) Notice: Subject to any disclaimer, the term of this patent is extended or adjusted under 35 U.S.C. 154(b) by 2205 days.

(21) Appl. No.: 10/718,412

(22) Filed: Nov. 19, 2003

(51) Int. Cl.
*H04W 4/00* (2009.01)
*H04W 72/00* (2009.01)
*H04W 40/00* (2009.01)

(52) U.S. Cl. ..... 370/341; 370/329; 455/450; 455/452.1; 455/453; 455/447

(58) Field of Classification Search ............ 370/341, 370/328, 329, 330, 332; 455/447, 448, 450, 455/452.1, 452.2, 453
See application file for complete search history.

(56) References Cited

U.S. PATENT DOCUMENTS

| | | | |
|---|---|---|---|
| 2003/0069042 A1* | 4/2003 | Sato et al. | 455/561 |
| 2004/0023660 A1* | 2/2004 | Ben-Eli | 455/450 |
| 2004/0097238 A1* | 5/2004 | Hwang et al. | 455/447 |
| 2004/0125772 A9* | 7/2004 | Wu et al. | 370/335 |
| 2004/0147235 A1* | 7/2004 | Jin et al. | 455/127.1 |

\* cited by examiner

*Primary Examiner* — Un C Cho
(74) *Attorney, Agent, or Firm* — Christopher & Weisberg, P.A.

(57) ABSTRACT

A scheme is provided for allocating spectral resource made up of a plurality of resource units in a multiple access wireless link linking a partition of a base station and at least one child user equipment of the partition in a wireless communications network. According to the scheme the same fixed allocation of resource units is made to each user equipment of the network. According to one embodiment a measure of a maximum likely number of child user equipments per partition of the network is determined. Then a fixed allocation of resource units based on the ratio of the number of resource units per unit time to the measure is calculated. Then the same fixed allocation of resource units is allocated to each child user equipment across the network. In one embodiment resource units which are not allocated in the fixed allocation remain unallocated to user equipments. In another embodiment the remaining resource units are allocated among the child user equipments by prioritizing user equipments having a high gain link. Also provided is a communications network and a resource allocation controller for a communications network which use the above scheme.

40 Claims, 4 Drawing Sheets

Determine measure M of a maximum likely number of child end user equipment per partition of the network  α

Calculate fixed allocation F

Allocate fixed allocation to each child user equipment

METHOD OF RESOURCE ALLOCATION IN A MULTIPLE ACCESS WIRELESS COMMUNICATIONS NETWORK

FIELD OF THE INVENTION

The present invention relates to the allocation of spectral resource amongst user equipments in a multiple access wireless network.

BACKGROUND OF THE INVENTION

A multiple access wireless network generally includes a number of geographically spaced base stations for providing network coverage over a geographical area. A number of user equipments located in the area communicate over the network via at least one of the base stations. The base stations may each have one or more partitions, formed by a combination of sectors and/or beams.

Generally, the channel gains for the radio links between the user equipments and all base station partitions are considered. Then each user equipment communicates with a parent partition selected to be that partition with the radio link to the user equipment having the highest channel gain. Thus, each base station partition will then have a number of child user equipments with which it communicates.

Each partition generally has a finite spectral resource over which it can communicate with its child user equipments. Conventionally, each user equipment is allocated an amount of spectral resource, e.g. one or more channels in a FDMA (Frequency Division Multiple Access) system, or a predetermined sub-set of timeslots in a TDMA (Time Division Multiple Access) system. In the conventional system, the spectral resource of a parent partition is shared equally among all its child user equipments and all spectral resource is reused at every partition (ie. N=1 re-use). Therefore, the number of resource units allocated to a child user equipment is dependent on the number of other child user equipments in that partition and so the number of resource units allocated to the child user equipments varies from partition to partition.

The uplink transmit power at which each user equipment transmits radio frequency signals is conventionally arranged so that user equipments experiencing a high gain transmit with a lower power so as to reduce interference to other cells.

In prior art systems there are generally many (ie. hundreds) of user equipments per partition and so the network load per partition does not vary much across the network. More recently, networks are supporting higher data rates (eg. for video streaming, etc.). A partition can support fewer simultaneously transmitting user equipments at higher data rates, which means that the variation in network load per partition becomes more varied. This variation can significantly effect the performance of the network.

Future wireless networks aim to provide increasingly higher rate services to an increasing number of users. Spectral resource is a limited and costly resource and so increasing the efficiency of the usage of spectral resource will become more and more important.

SUMMARY OF THE INVENTION

The present invention relates generally to a scheme for allocating spectral resource made up of a plurality of resource units in a multiple access link of a communications network by making a fixed allocation to each child user equipment of the network made up of the same number of resource units.

The fixed allocation may be based on an estimate of the maximum likely number of child user equipments per partition of the network, such that when said estimated number of child user equipments are using a link, all the resource units are shared equally between the child user equipments. When less than said estimated number of user equipments are using a link the fixed allocation remains unchanged and all user equipments receive the same fixed allocation with not all of the resource units being used up by the fixed allocation. This enables more user equipments to receive a higher level of service than in conventional resource allocation schemes, because the spectral resource across the network is shared more fairly. Also, when not all resource units are used the C/I level across the network improves, which improves the levels of service in particular to user equipments with lower gain links to their parent partition.

Alternatively, the fixed allocation may be arbitrarily set as a minimum number of resource units to be allocated to each user equipment of the network.

In an enhancement of the present invention, remaining resource units, unallocated to child user equipments in the fixed allocation, are allocated to child user equipments by prioritising child user equipments having a high gain. In this way user equipments with high gain links to their partition are proportionally allocated more spectral resource than those with low gain links. This further increases the number of user equipments experiencing high levels of service. Where power control is also utilised in the network so that user equipments with high gain links transmit at lower powers than user equipments with low gain links, the addition of the proportional allocation degrades the C/I level on the network by only a small amount.

In accordance with a first aspect of the invention, there is provided a method for use in a wireless communications network for allocating spectral resource made up of a plurality of resource units in a multiple access wireless link extending between a partition of a base station and at least one child user equipment of the partition, the method comprising:

establishing a number of resource units making up a fixed allocation of resource units which is the same for all user equipments of the network;

allocating the fixed allocation of resource units to each child user equipment in the partition.

In accordance with a second aspect of the present invention there is provided a wireless communication network comprising at least one base station having at least one partition via which at least one child user equipment communicates over a wireless link which link comprises spectral resource made up of a plurality of resource units wherein the network includes a processing block configured to establish a number of resource units making up a fixed allocation of resource units which is the same for all user equipments of the network and to allocate the fixed allocation of resource units to each child user equipment in the partition.

In accordance with a third aspect of the present invention there is provided a resource allocation controller for use in a wireless communications network for allocating spectral resource made up of a plurality of resource units in a multiple access wireless link extending between a partition of a base station and at least one child user equipment of the partition wherein the controller is configured to establish a number of resource units making up a fixed allocation of resource units which is the same for all user equipments of the network and to allocate the fixed allocation of resource units to each child user equipment in the partition. The resource allocation controller may be co-located or integrated in a base station of the network.

In accordance with a fourth aspect of the present invention there is provided executable software code stored on a computer readable medium for establishing a number of resource units making up a fixed allocation of spectral resource in a multiple access wireless link of a wireless communication network, the code comprising:

code to determine a measure of a maximum likely number of child user equipments per network partition; and     code to determine a fixed allocation of resource units based on the ratio of a number of resource units in the link per unit time to the measure.

In accordance with a fifth aspect of the present invention there is provided a programmed computer for establishing a number of resource units making up a fixed allocation of spectral resource in a multiple access wireless link of a wireless communication network, which stores computer executable program code, which code includes:

code for determining a measure of a maximum likely number of child user equipments per network partition; and     code for determining the fixed allocation of resource units based on the ratio of a number of resource units in the link per unit time to the measure.

In accordance with a sixth aspect of the present invention there is provided a computer readable medium having computer executable software code stored thereon, which code is for establishing a number of resource units making up a fixed allocation of spectral resource in a multiple access wireless link of a wireless communication network wherein the code is for carrying out the following:

determining a measure of a maximum likely number of child user equipments per network partition; and     determining a fixed allocation of resource units based on the ratio of a number of resource units in the link per unit time to the measure.

In accordance with a seventh aspect of the present invention there is provided computer executable software code stored on a computer readable medium for allocating a proportional allocation of spectral resource made up of a plurality of resource units in a multiple access wireless link of a wireless communication network, the code comprising:

code for discarding resource units allocated to child user equipments in a fixed allocation so as to determine remaining resource units;

code for determining the gain of the radio link between the partition and each child user equipment; and     code for allocating the remaining resource units among the child user equipments by prioritising user equipments having a high gain link.

In accordance with an eighth aspect of the present invention there is provided a wireless communication network comprising at least one base station having at least one partition via which at least one child user equipment communicates over a wireless link which link comprises spectral resource made up of a plurality of resource units wherein the network includes processing means for establishing a number of resource units making up a fixed allocation of resource units which is the same for all user equipments of the network and means for allocating the fixed allocation of resource units to each child user equipment in the partition.

In accordance with a ninth aspect of the present invention there is provided a resource allocation controller for use in a wireless communications network for allocating spectral resource made up of a plurality of resource units in a multiple access wireless link extending between a partition of a base station and at least one child user equipment of the partition wherein the controller comprises means for establishing a number of resource units making up a fixed allocation of resource units which is the same for all user equipments of the network and means for allocating the fixed allocation of resource units to each child user equipment in the partition.

In accordance with a tenth aspect of the present invention there is provided a method for use in a wireless communications network for allocating spectral resource made up of a plurality of resource units in a multiple access wireless link extending between a partition of a base station and at least one child user equipment of the partition, the method comprising:

determining a measure of a maximum likely number of child user equipments per partition of the network;

calculating a fixed allocation of resource units based on the ratio of a number of resource units in the partition per unit time to the measure; and     allocating the fixed allocation of resource units to each child user equipment in the partition.

In accordance with an eleventh aspect of the present invention there is provided a method for use in a wireless communications network for allocating spectral resource made up of a plurality of resource units in a multiple access wireless link extending between a partition of a base station and at least one child user equipment of the partition, the method comprising:

establishing a minimum number of resource units making up a fixed allocation of resource units which is to be allocated to all user equipments of the network;

allocating the fixed allocation of resource units to each child user equipment in the partition; and     allocating remaining resource units which are not allocated in the fixed allocation of resource units to child user equipments, hereafter remaining resource units, to child user equipments in the partition by:

determining the gain of the radio link between the partition and each child user equipment; and         allocating the remaining resource units among the child user equipments by prioritising user equipments having a high gain link.

The number of units making up the fixed allocation may be established by determining a measure of a maximum likely number of child user equipments per partition of the network and calculating the fixed allocation of resource units based on the ratio of a number of resource units in the partition per unit time to the measure.

Alternatively, the number of units making up the fixed allocation may be chosen arbitrarily as a minimum number of resource units to be allocated to each user equipment of the network.

The number of resource units making up the fixed allocation may be determined at a central location of the network. The allocation of resource units in accordance with the fixed allocation may be made for some or all partitions at a central location of the network. Alternatively, base stations may make an allocation of resource units for their own partitions in accordance with the fixed allocation. A base station may establish the number of units making up a fixed allocation by receiving an indication of the number of units making up the fixed allocation from such a central location.

The measure of the maximum likely number of user equipments per partition may be derived according to a Poisson distribution of the average number of user equipments per partition of the network. For example, the measure of the maximum likely number of user equipments per partition may correspond to between the $90^{th}$ and $100^{th}$ centile of a Poisson distribution of the average number of user equipments per partition.

The number of resource units making up the fixed allocation of resource units may be calculated according to the following equation:

$$F = T/M$$

where

F=number of resource units making up the fixed allocation;
T=number of resource units per unit time; and
M=maximum likely number of user equipments per partition.

The spectral resource may be made up of a number of frequency channels with each resource unit being a sub-set of the spectral resource smaller than a frequency channel, for example, each resource unit may be a time slot on a frequency channel.

The resource units which are not allocated in the fixed allocation of resource units to child user equipments may remain unallocated to user equipments. In this case where the number of user equipments on the link is less than the maximum likely number, not all of the resource units will be allocated to user equipments. This can increase the C/I level on the network as compared to the situation when all resource units are allocated.

In an enhancement of the present invention, resource units which are not part of the fixed allocation of resource units to child user equipments (hereafter denoted remaining resource units) are allocated among the child user equipments by prioritising user equipments having a high gain link. For example, the allocation of remaining resource units may be made by allocating the remaining resource units among the child user equipments in the partition in proportion to the gain of the radio links to the child user equipments.

The communication network may use power control in which the transmit power of each child user equipment is regulated according to the gain between that user equipment and its partition such that lower gain user equipments transmit with higher power than higher gain user equipments. For example, the transmit power of a user equipment may be regulated so that it is inversely proportional to the gain of the user equipment.

The wireless link may be a multiple access uplink or downlink, for example, it may be an OFDMA uplink. The method of allocating resource according to the present invention is the same for an uplink as for a downlink.

Other aspects and features of the present invention will become apparent to those ordinarily skilled in the art upon review of the following description of specific embodiments of the invention in conjunction with the accompanying Figures.

BRIEF DESCRIPTION OF THE DRAWINGS

In order that the present invention is more fully understood and to show how the same may be carried into effect, reference shall now be made, by way of example only, to the Figures as shown in the accompanying drawing sheets, wherein.

DETAILED DESCRIPTION OF PREFERRED EMBODIMENTS

There will now be described by way of example the best mode contemplated by the inventor for carrying out the invention. In the following description, numerous specific details are set out in order to provide a complete understanding of the present invention. It will be apparent, however, to those skilled in the art that the present invention may be put into practice with variations of the specific.

Figure 1:
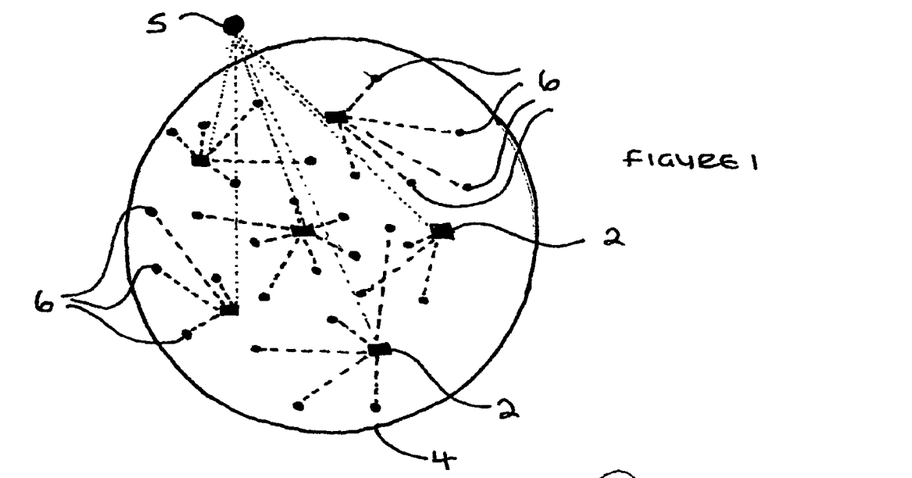
FIG. 1 shows schematically part of a multiple access communications network including an array of single partition omni-directional base stations each having a radio link to a plurality of child user equipments.

FIG. 1 shows part of a multiple access communications network comprising a plurality of base stations (2) spread out over a geographical area (4) covered by the network. User equipments (6) located in the geographical area (4) communicate via radio links (shown in dotted lines) with the base stations (2).

The base stations (2) may have one or more partitions formed by a combination of sectors and beams. In the FIG. 1 embodiment each base station (2) is omni-directional and so has one partition. In the FIG. 2 embodiment each base station (22) is tri-sectored and so has three partitions. Other ways of partitioning base stations using sectorization and beam arrangements are well known in the art and can be used with the present invention. Each user equipment (6, 24-28) chooses a partition which receives the radio frequency signal it transmits with the highest gain as its parent partition. The radio links between each user equipment (6) and its parent partition of its parent base station are shown in dashed lines in FIGS. 1 and 2. Accordingly, each base station partition has a number of child user equipments with which it communicates over the radio links.

Each partition has a finite spectral resource making up a downlink from a partition to child user equipments or an uplink from child user equipments to a partition. This spectral resource is split into orthogonal resource units which can be shared among child user equipments in the partition. There are generally a significantly higher number of resource units per partition than the number of user equipments for that partition. In the conventional allocation system a small number of resource units, eg. frequency channels and time slots tend to be allocated so as to support low rate users. According to the present invention larger numbers of resource units are allocated to user equipments so as to support higher data rates. The present invention provides a significant improvement in the flexibility with which spectral resource can be allocated to user equipments. It is this improved flexibility which is made use of by the spectral resource schemes according to the present invention.

Figure 2:
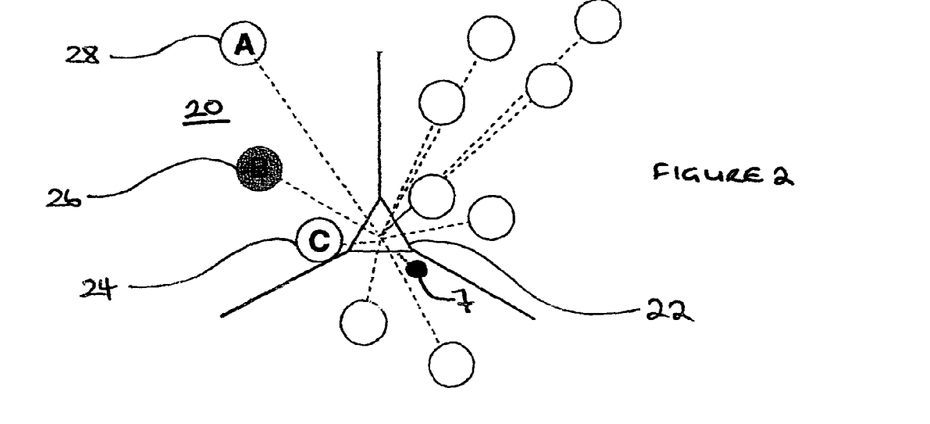
FIG. 2 shows schematically a tri-sectored base station of a multiple access communications network having three partitions, each of which has radio links to a plurality of child user equipments.

In FIG. 2 a tri-sectored base station (22) is shown having three sector-wide partitions. Each partition communicates over radio links (dashed lines) with its child user equipments. These radio links make up the downlink from the partition to the child user equipments and/or the uplink from child user equipments to the partition. For example, the partition (20) communicates over radio links with three child user equipments (24, 26, 28).

The conventional manner of allocating spectral resource among the three user equipments would be to allocate each user equipment (24, 26, 28) one or more frequency channels on the link over which to communicate with base station (22) or to allocate each user equipment (24, 26, 28) one or more predetermined sets of timeslots on the link until all of the spectral resource is allocated to the user equipments. In addition near in user equipments (eg. user equipment (24)) would transmit at a lower power than user equipments that are further away (eg. user equipment (28)) from the base station (22) so as to reduce interference.

With equal allocation the parent partition shares resource units equally amongst its child user equipments. Therefore, the number of units ($EQ_K$) allocated to a user equipment is:

$$EQ_K = N_{units}/N_{children[Pk]}$$

where
$EQ_K$=number of resource units allocated to the $K^{th}$ user equipment;
$N_{units}$=total number of resource units per partition per unit time;
$P_K$=the parent partition of the $K^{th}$ user equipment;
$N_{children[Pk]}$=number of child user equipments at partition $P_K$.

By using equal allocation user equipments in the same parent partition receive the same spectral resource allocation. However, the resource allocated to a user equipment is dependent on the number of other user equipments with which it shares a partition. The number of user equipments in each partition of a network can vary widely, especially where the network supports user equipments requiring a high data rate service. This means that there is a considerable variation in the spectral resource allocated to user equipments across the network. Therefore, with the conventional equal allocation scheme there is an inherent 'unfairness' about the amount of spectral resource allocated to individual user equipments across the network.

Figure 7:
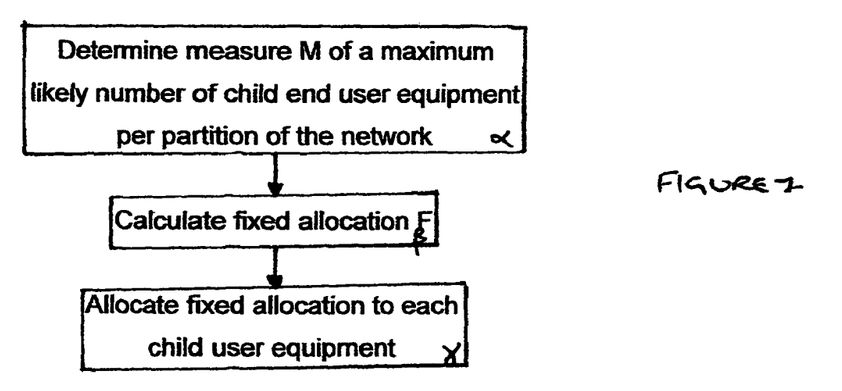
FIG. 7 is a flow diagram showing the method steps in a method of fixed allocation according to the present invention and in accordance with FIG. 3.

According to one embodiment of the present invention a statistical evaluation is made of the largest number (M) of user equipments likely to be present in a single partition at any one time [Box a of FIG. 7]. This can be calculated according to the following equation:

$$M = 1 + poissinv[90\%, N_{UEs}/N_B] \quad (1)$$

where

M=maximum likely number of user equipments per partition;
poissinv=inverse Poisson function;
$N_{UEs}$=number of user equipments in the network; and
$N_B$=number of base stations partitions in the network.

M is not the absolute maximum number of UEs, but in this example it is the number not exceeded in 90% of cases. This is derived, according to equation (1) above from the Poisson distribution based on the average number of user equipments per partition.

Then from the value of M a fixed resource allowance F made up of a number of resource units per user equipment can be calculated according to the following equation [Box 3 of FIG. 7]:

$$F \approx T/M \quad (2)$$

where
F=fixed resource allowance per user equipment per unit time;
T=total number of resource units per partition per unit time; and
M=maximum likely number of user equipments per partition.

In the network covering the geographical area (4) in FIG. 1, the value M and optionally the value of F are calculated by a controller (5) which communicates with the base stations (2) via a backhaul network (shown in dotted lines in FIG. 1). The controller (5) periodically calculates the value M from the number of user equipments in the network and the number of base stations in the network. Where the number of resource units per partition is constant across the network, the controller (5) may also calculate the value of F based on the number of resource units per partition per unit time. The value of F is then communicated by the controller (5) to the base stations (2) within the network for the base stations to allocate the resource units in its partitions. Alternatively, the value of M is communicated by the controller (5) to the base stations (2) within the network and the base stations calculate the value of F.

Alternatively, as shown in FIG. 2, a controller (7) for calculating the values of M and optionally F may be co-located with a base station (22). This base station (22) would then communicate with the other base stations in the network in order to ascertain the information it requires to calculate the values of M and F and to communicate the value of M and/or F to the other base stations.

Figure 3:
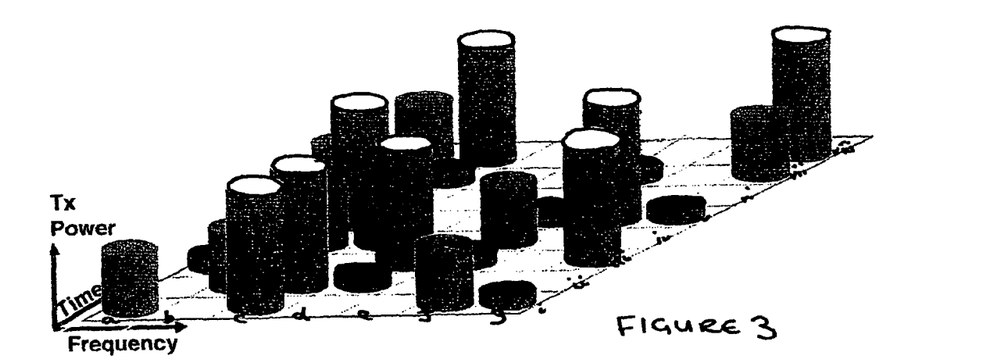
FIG. 3 shows schematically a first fixed allocation scheme according to the present invention for allocating the spectral resource of a base station partition of FIG. 1 or FIG. 2 among child user equipments.

Then an allocation of resource to user equipments is made, generally by the base stations, in accordance with FIG. 3 [Box y of FIG. 7]. In FIG. 3, the spectral resource per unit time of a base station partition, for example a partition (20) of the base station (22), is represented as a grid of seven frequencies (a to g) and eight timeslots (i to viii). Each resource unit is a timeslot on a frequency and so the total number of resource units per partition per unit time is T=56. For the network incorporating the base station (22) the maximum likely number of user equipments per partition is 7 and so in accordance with equation (2) the fixed resource allowance per user equipment is F=8.

So each user equipment (24, 26, 28) in the single partition of base station (22) is allocated 8 resource units, as shown in FIG. 3. A first user equipment (24) is closest to the base station (22) and has a high gain radio link with the base station and so transmits with a low power as represented by the vertical Tx power axis of FIG. 3. So the first user equipment (24) is allocated the eight time slots in the grid of FIG. 3 occupied by a black topped low transmit power link signal. A second user equipment (26) is further away from the base station (22) than the first user equipment (24) and has a medium gain radio link with the base station and so transmits with a medium power as represented by the vertical Tx power axis of FIG. 3. So the second user equipment is allocated the eight time slots in the grid of FIG. 3 occupied by a uniform grey medium transmit power link signal. A third user equipment (28) is furthest away from the base station (22) and has a low gain radio link with the base station and so transmits with a high power as represented by the vertical Tx power axis of FIG. 3. So the third user equipment is allocated the eight time slots in the grid of FIG. 3 occupied by a white topped high transmit power link signal.

Figure 9:
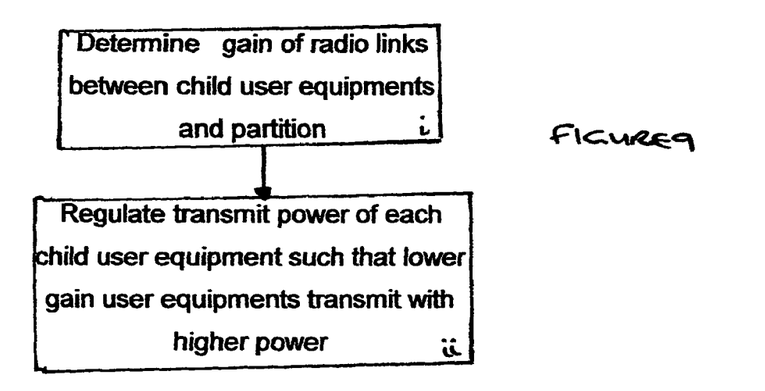
FIG. 9 is a flow diagram showing the method steps in a power control scheme which enhances the performance of the resource unit allocation schemes according to the present invention.

So in the embodiment of the present invention described above in relation to FIG. 3, on the uplink user equipments with high gain links to their parent base station partition power down to reduce interference with other partitions of the network. The gain of the radio links between child user equipments and their partition are measured [Box i of FIG. 9]. Then each user equipment transmits signals over the uplink with a transmit power which is inversely proportional to the gain on its link to its parent base station partition [Box ii of FIG. 9]. This ensures that the power received at the partition is the same for all child user equipments. This received power level may be made constant for all partitions in the network.

The number of user equipments per partition varies considerably across the network. With conventional equal allocation, the resource per user equipment depends on the number of other user equipments sharing the partition. Performance over the network, averaged over the user equipments is fairer if all user equipments are allocated the same amount of fixed resource F. Also, because not all resource units in the partition are necessarily allocated, C/I levels are improved as compared to the conventional equal allocation system.

Figure 4:
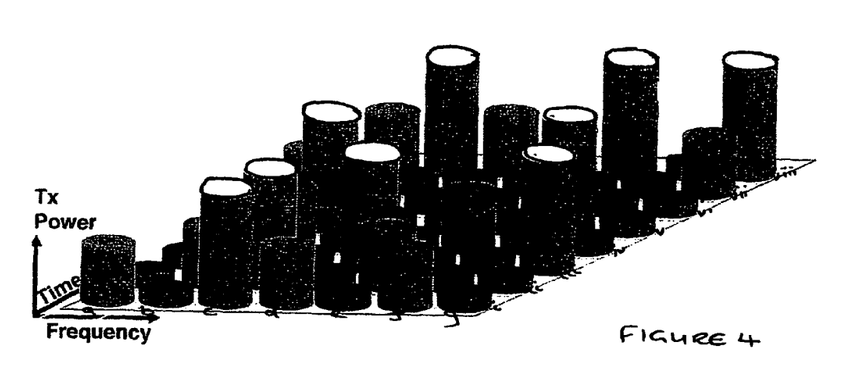
FIG. 4 shows schematically a second proportional with minimum fixed allocation scheme according to the present invention for allocating the spectral resource of a base station partition of FIG. 1 or FIG. 2 among child user equipments.

FIG. 4 shows a second allocation of spectral resource of a partition according to the present invention. As with FIG. 3, the spectral resource per unit time of a partition, for example the partition (20) of base station (22) of FIG. 2, is represented as a grid of seven frequencies (a to g) and eight timeslots (i to viii). Each resource unit is a timeslot on a frequency and so the total number of resource units per partition per unit time is T=56. For the network incorporating the base station (22) the maximum likely number of user equipments per partition is 7 and so in accordance with equation (2) the fixed resource allowance per user equipment is F=8. So in a similar way to FIG. 3 a fixed allocation of 8 resource units is allocated to each of the three user equipments (24, 26, 28) in the partition (20) [Boxes a to y of FIG. 7].

In this way, 24 resource units out of the possible 56 resource units are allocated. This leaves 32 resource units un-allocated. The gain of the radio links between the child user equipments and their partition are measured [Box a of FIG. 8]. Then in the allocation system according to FIG. 4 the remaining un-used resource units are allocated between the three user equipments (24, 26, 28) in proportion to the gain of the radio link between each of the three user equipments and the base station (22) [Box b of FIG. 8].

In the example of FIG. 2, there is a low gain link between the third user equipment (28) and the base station (22) and so the third user equipment (28) is allocated only one more resource unit in addition to the minimum fixed allocation of F=8 resource units, giving an allocation to the third user equipment (28) of 9 resource units. So the third user equipment is allocated the nine time slots in the grid of FIG. 4 occupied by a white topped high transmit power link signal. Also, in the FIG. 2 example, there is a medium gain link between the second user equipment (26) and the base station (22) and so the second user equipment (26) is allocated 3 more resource units in addition to the minimum fixed allocation of F=8 resource units, giving an allocation to the third user equipment (28) of 11 resource units. So the second user equipment is allocated the eleven time slots in the grid of FIG. 4 occupied by a uniform grey medium transmit power link signal. Finally, in the FIG. 2 example, there is a high gain link between the first user equipment (24) and the base station (22) and so the first user equipment (24) is allocated 28 more resource units in addition to the minimum fixed allocation of F=8 resource units, giving an allocation to the first user equipment (24) of 36 resource units. So the first user equipment is allocated the thirty six time slots in the grid of FIG. 4 occupied by a black topped low transmit power link signal (some of which are hidden by the medium and high powered link signals).

The allocation system according to FIG. 4 which is a proportional allocation subject to a minimum fixed allocation increases the data rate available to those user equipments having a high gain link to its base station. This significantly improves overall base station throughput levels. However, there is a slight decrease in the C/I level as compared to the allocation system of FIG. 3 in which generally not all spectral resource is allocated. This causes a small degradation in the throughput for user equipments having a low gain link to their parent base station.

A proportional allocation scheme based on the same principles as that described above in relation to FIG. 4 can be represented by the following equation:

$$D_K = \max[\gamma(UE_k, P_K)/\min[\gamma(UE_k, P_K)], F] \qquad (3)$$

where
$UE_K$=Kth user equipment in the network;
$D_K$=number of resource units $UE_k$ would like to have;
$\gamma(UE_k, P_K)$=channel gain between $UE_K$ and its parent base station $P_K$;
$\min[\gamma(UE_k, P_K)]$=minimum gain to parent of all user equipments in the network;
F=minimum limit on the number of resource units that can be allocated (see equation 2 above).

It can be seen from equation (3) that user equipments having a high gain link to its parent partition will have a relatively high value of $D_K$, whereas user equipments having a low gain link to its parent will have a relatively low value of $D_K$, subject to the minimum value of F.

Although an user equipment may desire an allocation of $D_K$ resource units, there are constraints on the actual number of units allocated.

Figure 5:
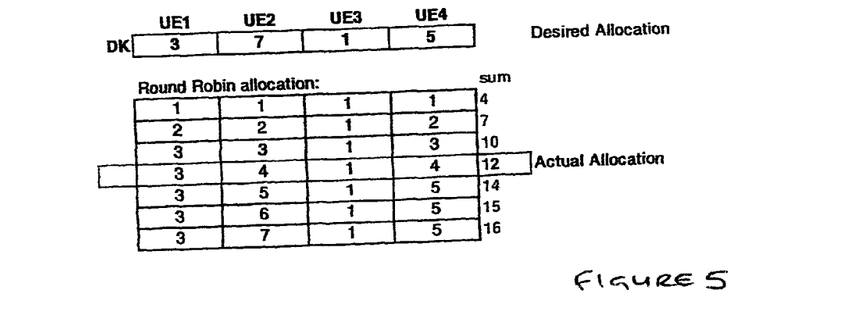
FIG. 5 shows schematically a round robin allocation method of allocating resource units to user equipments in accordance with a proportional with minimum fixed allocation scheme according to the present invention.

FIG. 5 shows a simple example of how 12 resource units are allocated to 4 user equipments (UE1, UE2, UE3, UE4) in a partition of a network. In this example F=1. The lower table of FIG. 5 shows how the resource units are allocated on a round robin basis until all units have been allocated. On each iteration of the round robin, each user equipment is allocated one additional resource unit. Once a user equipment has been allocated its desired number of resource units $D_K$, it is not allocated further resource units in subsequent iterations of the round robin. The round robin ceases when all resource units are allocated. All user equipments get the minimum allocation of F=1, in particular user equipment UE3 gets this allocation. In addition UE3 which also has a relatively low desired allocation $D_K$=3 gets its desired allocation. UE2 and UE4 with respective relatively high values of $D_K$=7 and $D_K$=5, both receive an equal allocation of four resource units which is short of their desired allocation $D_K$, ie. their desired allocation is truncated. This allocation scheme prioritises allocation to user equipments having high gain radio links to their parent partition [Box b of FIG. 8], ie. having high values of $D_K$, subject to all user equipments receiving the minimum allocation F, which in this case is F=1.

As an alternative to the allocation according to equation (3) and represented by the allocation of FIG. 5, an alternative proportional allocation scheme based on the same principles as that described above in relation to FIG. 4 can be represented by the following equation:

$$Pv2_K = \max[T\gamma(UE_k, P_K)/\Sigma\gamma(UE_C, P_K), F] \quad (4)$$

where
- T=number of resource units in a network partition;
- $UE_K$=Kth user equipment of the network;
- $Pv2_K$=number of resource units allocated to $UE_K$;
- $\gamma(UE_k, P_K)$=channel gain between $UE_K$ and its parent $P_K$;
- $\Sigma\gamma(UE_C, P_K)$=sum of all UE-parent channel gains for UEs with the same parent as $UE_K$;
- F=minimum fixed allocation according to equation (2) above.

Figure 8:
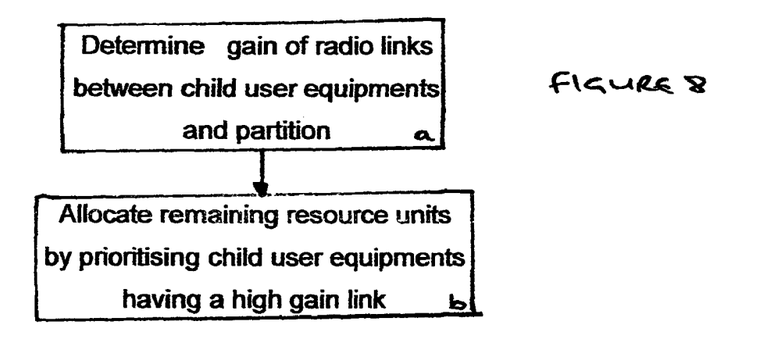
FIG. 8 is a flow diagram showing the additional method steps which take place after the fixed allocation method steps of FIG. 7 for making a proportional allocation according to the present invention, for example in accordance with FIG. 4 or FIG. 5.

This scheme aims to allocate a share of resource units to child user equipments in proportion to their channel gain relative to the other child user equipments for that partition [Box b of FIG. 8]. This scheme ensures that, provided that there is at least one user equipment per partition, all resource units are allocated and so there is no desired allocation $D_K$ which requires truncation, as described in relation to FIG. 4. The limit F must be at least F=1 or many user equipments will not be allocated any resource units.

The proportional allocation schemes described above are provide the best results when used in conjunction with power control, in which each user equipment transmits signals with a transmit power which is inversely proportional to the gain on its link to its parent base station partition. In the proportional allocation schemes described above in relation to equation (4) the number of desired units is proportional to $\gamma(UE_k, P_K)$ and the per unit power is inversely proportional to $\gamma(UE_k, P_K)$ and so the product is constant. However, in the allocation scheme according to equation (3) large desired allocations are often truncated, so that high gain user equipments may transmit less total gain than low power user equipments.

Once resource units have been allocated to user equipments and the transmit power set, it is possible to calculate the C/I level achieved on each frequency at each partition. The received carrier power is approximately constant for the controlled power schemes discussed herein. The interference power measured at any given partition for any resource unit, is the sum of the power received from user equipments at other partitions using the same resource unit. Simulations can be used to generate and output which is a per unit C/I probability density function (PDF) for all units at the central base station.

In all but the scheme according to FIG. 3, all units are always reused at each partition, so we are effectively calculating C/I levels for an N=1 scheme. The conventional allocation scheme can be shown to have identical C/I levels to N=1 schemes with a single user equipment per partition, provided the load is high enough to ensure that all partitions are occupied. However, with the proportional allocation schemes, the probability of an interfering user equipment re-using a particular resource unit depends on the channel gain to the parent. Since user equipments with low gains are allocated less resource, they are less likely to be re-using a particular unit elsewhere in the network than a high gain user equipment. Fortunately, it is the low gain user equipments which cause the most interference. So proportional allocation should improve C/I levels by reducing the probability of strong interference.

Some simulations were carried out to quantify the performance of the allocation schemes described above. These simulations are based on an OFDMA (Orthogonal Frequency Division Multiple Access) uplink having a 5 MHz bandwidth. Within an OFDMA physical layer, the spectral resource was divided into a number of orthogonal frequencies or tones and timeslots. In this example there were 512 resource units (timeslots on frequencies). The simulations are also based on a network of 19 tri-cellular base stations with an average of four user equipments per base station partition, 1-1 links with AMC (Adaptive Modulation and Coding) and Rayleigh fading.

The throughput achieved on a resource unit is calculated from the C/I level for that unit, based on the Shannon Bound:

$$Thr_U = \frac{1}{N_{units}} \log_2(1 + C/I)$$

where
- $Thr_U$=per resource unit throughput in bit/sec/Hz;
- $N_{units}$=number of resource units (in this example 512);
- C/I=carrier to interference level.

$Thr_u$ can be multiplied by the bandwidth and time fraction that each resource unit represents, to give the absolute throughput in bit/sec.

The Shannon bound represents the maximum theoretical throughput that can be achieved with a giver C/I level. In a real modem, implementation losses and a finite set of modulation and coding sets would result in a lower throughput. It can be shown that the throughput achieved with a realistic code set can be approximated by the Shannon bound shifted by 2 dB and with limits on the minimum and maximum throughput.

User equipment throughput is the sum of the resource unit throughputs for those resource units allocated to that user equipment. The user equipment data rate can the be obtained by multiplying its throughput in bit/sec/Hz, by the total bandwidth represented by the entire set of resource units allocated to the user equipment. For example, assuming a bandwidth of 5 MHz, then a user equipment with a throughput of 0.1 bit/sec/Hz achieves a data rate of 500 kbps. Data rates of interest are voice (around 10 kbps), low quality video (around 60 kbps) and high quality video (around 760 kbps). The 'coverage' at a particular data rate can be evaluated from the cumulative distribution function (CDF) of user equipment throughput.

Partition throughput is the sum of throughputs of all child user equipments for that partition. This is equal to the sum of throughputs for all resource units of the partition. Base station throughput is the sum of throughputs for all partitions at that base station.

Figure 6:
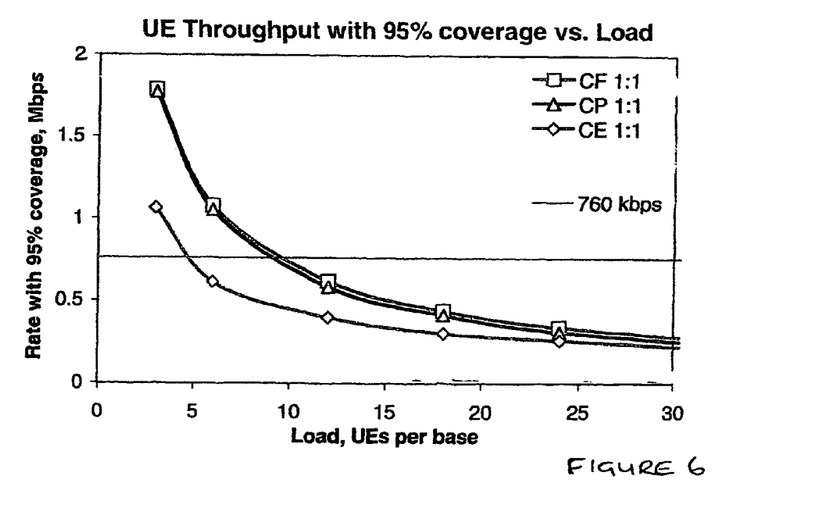
FIG. 6 is a graph of network load (average user equipments per base station) versus data rate supported with 95% coverage achieved by the fixed allocation scheme and proportional allocation scheme according to the present invention as compared to the convention equal allocation scheme.

The relative performance of the conventional equal allocation scheme to those schemes according to the present invention may be appreciated by considering the number of user equipments which can be supported per partition with a specific user equipment data rate and coverage. FIG. 6 illustrates this point and is a graph of the load, ie. the average number of user equipments per base station versus the maximum data rate that can be supported by 95% of the user equipments. The fixed allocation scheme according to FIG. 3 is denoted on the FIG. 6 graph as the CF line and the proportional allocation according to equation 3 is denoted on the FIG. 6 graph as the CP line. The conventional equal allocation scheme commonly used in the prior art is denoted on the FIG. 6 graph as the CE line. It can therefore be seen from the FIG. 6 graph that the allocation schemes according to the present invention enable significantly more user equipments to support a high data rate than the conventional scheme.

Taking a data rate of 760 kbps, it can be seen from the graph in FIG. 6 that the conventional allocation scheme can support only 4.5 user equipments per partition. The fixed allocation scheme described above in relation to FIG. 3 (CF) can support 9.1 user equipments per partition at a data rate of 760 kbps. The proportional allocation scheme described above in relation to equation 3 can support 8.7 user equipments per partition at a data rate of 760 kbps. The 760 kbps level is chosen as a rate which provides high quality streaming video. Therefore, the allocation schemes according to the present invention can support around twice as many user equipments per partition than when a conventional allocation scheme is used.

It should be noted that the mean base station throughput for the conventional scheme is 11.7, for the fixed allocation scheme according to FIG. 3 is 9.7 and for the scheme according to equation 3 is 12.9. The high mean base station throughput for the conventional scheme is mainly due to a very high throughput in a small number of user equipments having high gain links. The primary achievement of the present invention is the ability to increase the proportion of user equipments that can support higher data rates, ie. a higher proportion of users are provided with a better level of service. By controlling the power as described above, cell throughput is diminished but there is a dramatic increase in the number of high rate user equipments which can be supported. The fixed allocation on the basis of network load according to the FIG. 3 allocation scheme of the present invention instead of the conventional equal allocation amongst users sharing a partition enables a 'fairer' distribution of network resource across the network. Then additional proportional allocation (for example the FIG. 4 embodiment) in proportion to channel gain causes an increased base station throughput with only a small degradation of the number of user equipments supported at high rates.

Figure 10:
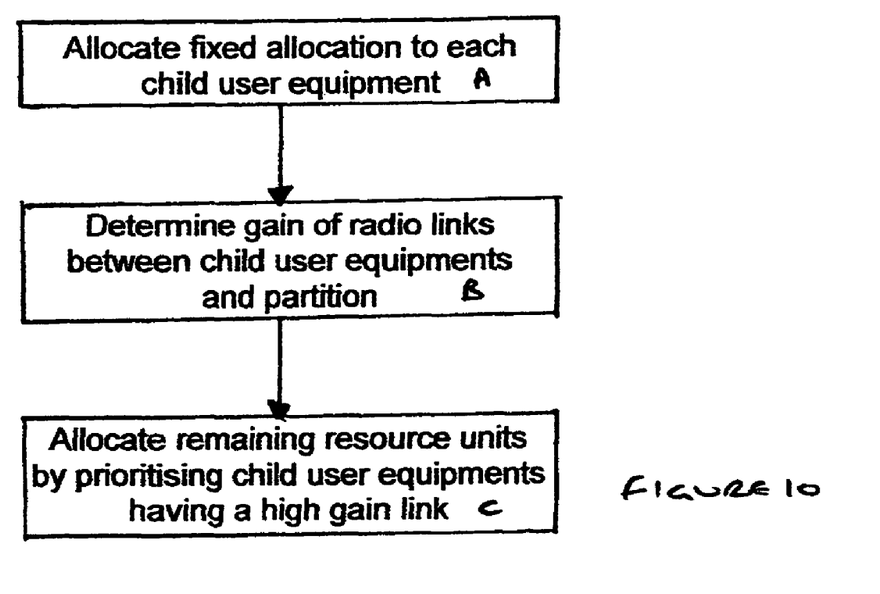
FIG. 10 is a flow diagram showing the method steps in an embodiment of the present invention in which an arbitrary fixed allocation is made to all child user equipments across the network and then a proportional allocation is made of the remaining resource units by prioritising user equipments with high gain links.

In a further embodiment of the present invention, shown in FIG. 10, the value of the fixed allocation F may be chosen arbitrarily as a minimum allocation of resource units per user equipment across the network. This arbitrary fixed allocation is communicated to all the base stations (2, 22) across the network, and the controller (5, 7) allocates the fixed allocation F to the child user equipments (6, 24, 26, 28) [Box A in FIG. 10]. Then the controller (5, 7) determines the gain of the radio links between the child user equipments and the partition with which they communicate [Box B in FIG. 10]. Finally, the controller (5, 7) allocates the remaining resource units by prioritising child user equipments having a high gain link, for example in accordance with the proportional allocation schemes described above.

The method steps described above in relation to FIGS. 7, 8 and 10 may be carried out by a processing means or a resource allocation controller which may be located and/or integrated in a network controller unit (5, 7) or in a base station (2, 22) or shared between both. In particular the processing means or the resource allocation controller may be embodied as a programmed computer, which stores computer executable code for making the computer execute the method steps described above in particular in relation to FIGS. 7, 8 and 10. The allocation schemes according to the present invention may be embodied in computer executable software stored on a computer readable medium for making a computer execute the method steps described above with particular reference to FIGS. 7, 8 and 10. A computer readable medium may be provided having computer executable software code stored on it, which code is for making a computer execute the method steps described above with particular reference to FIGS. 7, 8 and 10.

The invention claimed is:

1. A method for use in a wireless communications network for allocating spectral resource made up of a plurality of resource units in a multiple access wireless link extending between a partition of a base station and at least one child user equipment of the partition, wherein the network has at least one base station which has at least two partitions or the network has at least two base stations, each having at least one partition, the method comprising:
 establishing a number of resource units making up a fixed allocation of resource units, said fixed allocation of resource units being the same for all user equipments of the network;
 allocating the fixed allocation of resource units to each child user equipment in the partition.

2. The method according to claim 1 wherein the number of resource units making up the fixed allocation is established by:
 determining a measure of a maximum likely number of child user equipments per partition of the network;
 calculating the fixed allocation of resource units based on the ratio of a number of resource units in the partition per unit time to the measure.

3. The method according to claim 2 wherein the measure of the maximum likely number of user equipments per partition is derived according to a Poisson distribution of the average number of user equipments per partition of the network.

4. The method according to claim 1 wherein the fixed allocation is a selected minimum number of resource units.

5. The method according to claim 1 wherein the spectral resource is made up of a number of frequency channels and each resource unit is a sub-set of the spectral resource smaller than a frequency channel.

6. The method according to claim 1 wherein resource units which are not allocated in the fixed allocation of resource units to child user equipments remain unallocated to user equipments.

7. The method according to claim 1 wherein the method additionally comprises allocating remaining resource units which are not allocated in the fixed allocation of resource units to child user equipments, hereafter remaining resource units, to child user equipments in the partition by:
 determining the gain of the radio link between the partition and each child user equipment; and
 allocating the remaining resource units among the child user equipments by prioritising user equipments having a high gain link.

8. The method according to claim 1 wherein the method additionally comprises allocating remaining resource units which are not allocated in the fixed allocation of resource units to child user equipments, hereafter remaining resource units, to child user equipments in the partition by:
 determining the gain of the radio link between the partition and each child user equipment; and
 allocating the remaining resource units among the child user equipments in the partition in proportion to the gain of the radio links to the child user equipments.

9. The method according to claim 1 additionally comprising:
 determining the gain of the radio link between the partition and each child user equipment of the partition; and
 regulating the transmit power of each child user equipment according to the determined gain for that user equipment such that lower gain user equipments transmit with higher power than higher gain user equipments.

10. The method according to claim 1 additionally comprising:
    determining the gain of the radio link between the partition and each child user equipment of the partition; and
    regulating the transmit power of each child user equipment such that the transmit power is inversely proportional to the gain.

11. A method for use in a wireless communications network for allocating spectral resource made up of a plurality of resource units in a multiple access wireless link extending between a partition of a base station and at least one child user equipment of the partition, wherein the network has at least one base station which has at least two partitions or the network has at least two base stations, each having at least one partition, the method comprising:
    establishing a number of resource units making up a fixed allocation of resource units, said fixed allocation of resource units being the same for all user equipments of the network;
    allocating the fixed allocation of resource units to each child user equipment in the partition,
    wherein the number of resource units making up the fixed allocation is established by:
    determining a measure of a maximum likely number of child user equipments per partition of the network;
    calculating the fixed allocation of resource units based on the ratio of a number of resource units in the partition per unit time to the measure,
    wherein the fixed allocation of resource units is calculated according to the following equation:

$F = T/M$ where
    F=number of resource units making up the fixed allocation;
    T=number of resource units per unit time; and
    M=maximum likely number of user equipments per partition.

12. Computer executable software code stored on a non-transitory computer readable medium for making a computer execute the method of claim 1.

13. A non-transitory programmed computer, which stores computer executable program code for making the computer execute the method of claim 1.

14. A non-transitory computer readable medium having computer executable software code stored thereon, which code is for making a computer execute the method of claim 1.

15. A wireless communication network, wherein the network has at least one base station which has at least two partitions or the network has at least two base stations, each having at least one partition, the network to allow at least one child user equipment to communicate over a wireless link which link comprises spectral resource made up of a plurality of resource units, wherein the network includes a processing block configured to establish a number of resource units making up a fixed allocation of resource units, said fixed allocation of resource units being the same for all user equipments of the network, and to allocate the fixed allocation of resource units to each child user equipment in a particular partition.

16. The network according to claim 15 wherein the number of resource units making up the fixed allocation is established by determining a measure of a maximum likely number of child user equipments per partition and calculating the fixed allocation of resource units based on the ratio of a number of resource units in per partition per unit time to the measure.

17. The network according to claim 16 wherein the measure of the maximum likely number of user equipments per partition is derived according to a Poisson distribution of the average number of user equipments per partition.

18. The network according to claim 15 wherein the fixed allocation is a selected minimum number of resource units.

19. The network according to claim 15 wherein the spectral resource is made up of a number of frequency channels and each resource unit is a sub-set of the spectral resource smaller than a frequency channel.

20. The network according to claim 15 wherein resource units which are not allocated in the fixed allocation of resource units to child user equipments remain unallocated to user equipments.

21. The network according to claim 15 wherein, for a given partition, the processing block is configured to allocate remaining resource units which are not allocated in the fixed allocation of resource units to each user equipment by allocating the remaining resource units among the child user equipments by prioritising user equipments having a high gain link to the partition.

22. The network according to claim 15 wherein, for a given partition, the processing block is configured to allocate remaining resource units which are not allocated in the fixed allocation of resource units to each user equipment by allocating the remaining resource units among the child user equipments in the partition in proportion to the gain of the radio links between the child user equipments and the partition.

23. The network according to claim 15 wherein the transmit power of each child user equipment is regulated according to the gain between that user equipment and its partition such that lower gain user equipments transmit with higher power than higher gain user equipments.

24. A resource allocation controller for use in a wireless communications network for allocating spectral resource made up of a plurality of resource units in a multiple access wireless link extending between a partition of a base station and at least one child user equipment of the partition, wherein the network has at least one base station which has at least two partitions or the network has at least two base stations, each having at least one partition, wherein the controller is configured to establish a number of resource units making up a fixed allocation of resource units, said fixed allocation of resource units being the same for all user equipments of the network; and to allocate the fixed allocation of resource units to each child user equipment in the partition.

25. The controller according to claim 24 wherein the number of resource units making up the fixed allocation of resource units is established by obtaining a measure of a maximum likely number of child user equipments per partition of the network and obtaining a fixed allocation of resource units based on the ratio of a number of resource units in the partition per unit time to the measure.

26. The controller according to claim 25 wherein the measure of the maximum likely number of user equipments per partition is derived according to a Poisson distribution of the average number of user equipments per partition.

27. The controller according to claim 24 wherein the spectral resource is made up of a number of frequency channels and each resource unit is a sub-set of the spectral resource smaller than a frequency channel.

28. The controller according to claim 24 wherein the fixed allocation is a selected minimum number of resource units.

29. The controller according to claim 24 wherein resource units which are not allocated in the fixed allocation of resource units to child user equipments remain unallocated to user equipments.

30. The controller according to claim 24 which is configured to allocate remaining resource units which it did not allocate in the fixed allocation of resource units by prioritising child user equipments of the partition having a high gain link to the partition.

31. The controller according to claim 24 which is configured to allocate remaining resource units which it did not allocate in the fixed allocation of resource units by allocating the remaining resource units among the child user equipments in the partition in proportion to the gain of the radio links to the child user equipments.

32. The controller according to claim 24 for deployment in a network in which the transmit power of each child user equipment is regulated according to the gain between that user equipment and its partition such that lower gain user equipments transmit with higher power than higher gain user equipments.

33. Computer executable software code stored on a non-transitory computer readable medium for establishing a number of resource units making up a fixed allocation of spectral resource made up of a plurality of resource units in a multiple access wireless link of a wireless communication network, wherein the network has at least one base station which has at least two partitions or the network has at least two base stations, each having at least one partition, the code comprising:
  code to determine a measure of a maximum likely number of child user equipments per network partition; and
  code to determine a fixed allocation of resource units based on the ratio of a number of resource units in the link per unit time to the measure, said fixed allocation of resource units being the same for all user equipments of the network.

34. A non-transitory programmed computer for establishing a number of resource units making up a fixed allocation of spectral resource made up of a plurality of resource units in a multiple access wireless link of a wireless communication network, the programmed computer storing computer executable program code, wherein the network has at least one base station which has at least two partitions or the network has at least two base stations, each having at least one partition, said code includes:
  code for determining a measure of a maximum likely number of child user equipments per network partition; and
  code for determining the fixed allocation of resource units, said fixed allocation of resource units being same for all user equipments of the network, based on the ratio of a number of resource units in the link per unit time to the measure.

35. A non-transitory computer readable medium having computer executable software code stored thereon, which code is for establishing a number of resource units making up a fixed allocation of spectral resource made up of a plurality of resource units in a multiple access wireless link of a wireless communication network, wherein the network has at least one base station which has at least two partitions or the network has at least two base stations, each having at least one partition, wherein the code is for carrying out the following:
  determining a measure of a maximum likely number of child user equipments per network partition; and
  determining a fixed allocation of resource units based on the ratio of a number of resource units in the link per unit time to the measure, said fixed allocation of resource units being the same for all user equipments of the network.

36. Computer executable software code stored on a non-transitory computer readable medium for allocating a proportional allocation of spectral resource made up of a plurality of resource units in a multiple access wireless link of a wireless communication network, wherein the network has at least one base station which has at least two partitions or the network has at least two base stations, each having at least one partition, the code comprising:
  code for discarding resource units allocated to child user equipments in a fixed allocation so as to determine remaining resource units, said fixed allocation of resource units being the same for all user equipments of the network;
  code for determining the gain of the radio link between the partition and each child user equipment; and
  code for allocating the remaining resource units among the child user equipments by prioritising user equipments having a high gain link.

37. A wireless communication network, wherein the network has at least one base station which has at least two partitions or the network has at least two base stations, each having at least one partition, the network to allow at least one child user equipment to communicate over a wireless link which link comprises spectral resource made up of a plurality of resource units, wherein the network includes processing means for establishing a number of resource units making up a fixed allocation of resource units, said fixed allocation of resource units being the same for all user equipments of the network, and means for allocating the fixed allocation of resource units to each child user equipment in a particular partition.

38. A resource allocation controller for use in a wireless communications network for allocating spectral resource made up of a plurality of resource units in a multiple access wireless link extending between a partition of a base station and at least one child user equipment of the partition, wherein the network has at least one base station which has at least two partitions or the network has at least two base stations, each having at least one partition, wherein the controller comprises means for establishing a number of resource units making up a fixed allocation of resource units, said fixed allocation of resource units being the same for all user equipments of the network, and means for allocating the fixed allocation of resource units to each child user equipment in the partition.

39. A method for use in a wireless communications network for allocating spectral resource made up of a plurality of resource units in a multiple access wireless link extending between a partition of a base station and at least one child user equipment of the partition, wherein the network has at least one base station which has at least two partitions or the network has at least two base stations, each having at least one partition, the method comprising:
  determining a measure of a maximum likely number of child user equipments per partition of the network;
  calculating a fixed allocation of resource units based on the ratio of a number of resource units in the partition per unit time to the measure, said fixed allocation of resource units being the same for all user equipments of the network; and
  allocating the fixed allocation of resource units to each child user equipment in the partition.

40. A method for use in a wireless communications network for allocating spectral resource made up of a plurality of resource units in a multiple access wireless link extending between a partition of a base station and at least one child user equipment of the partition, wherein the network has at least one base station which has at least two partitions or the network has at least two base stations, each having at least one partition, the method comprising:

establishing a minimum number of resource units making up a fixed allocation of resource units, said fixed allocation of resource units being the same for all user equipments of the network;

allocating the fixed allocation of resource units to each child user equipment in the partition; and     allocating remaining resource units which are not allocated in the fixed allocation of resource units to child user equipments, hereafter remaining resource units, to child user equipments in the partition by:

determining the gain of the radio link between the partition and each child user equipment; and         allocating the remaining resource units among the child user equipments by prioritising user equipments having a high gain link.

* * * * *